United States Patent [19]

Bennett, Jr.

[11] 4,047,635

[45] Sept. 13, 1977

[54] ARTICLE DISPENSING APPARATUS FOR SELECTIVELY DISPENSING ARTICLES

[76] Inventor: Arthur A. Bennett, Jr., West Covina, Calif. 91793

[21] Appl. No.: 702,235

[22] Filed: July 2, 1976

Related U.S. Application Data

[63] Continuation-in-part of Ser. No. 608,785, Aug. 28, 1975, abandoned.

[51] Int. Cl.[2] .................... B65G 1/00

[52] U.S. Cl. .................... 221/5; 221/86

[58] Field of Search .................... 221/2, 13, 94, 115, 221/120, 122, 15, 5, 75, 86; 206/538; 194/4 R

[56] References Cited

U.S. PATENT DOCUMENTS

| | | | |
|---|---|---|---|
| 1,038,668 | 9/1912 | Sheehan | 221/86 |
| 3,166,214 | 1/1965 | Stevens et al. | 221/5 |
| 3,802,600 | 4/1974 | Shaw | 221/5 |
| 3,815,780 | 6/1974 | Bauer | 221/15 |

*Primary Examiner*—Stanley H. Tolberg
*Attorney, Agent, or Firm*—Lyon & Lyon

[57] ABSTRACT

An apparatus and method for selectively dispensing articles is disclosed. The apparatus is especially suited for dispensing pills in hospitals and nursing homes, wherein stringent controls are needed to prevent mistakes in dispensing or misuse of prescribed pills. The apparatus comprises a plurality of magazines or cassettes, each magazine containing a number of doses of a particular pill prescribed for the patient. The pill magazines are locked so that the pills cannot be removed without insertion into the dispensing apparatus, with the dispensing apparatus being operable only by authorized personnel. The magazines contain a plurality of rotatable compartments for storing several days supply of the particular pill, each compartment containing the unit dose prescribed for the particular patient. As is often the case in hospitals and at nursing homes, where a patient is to take more than one pill at a particular time, a plurality of magazines are inserted into the dispensing apparatus, and then the dispenser is activated to dispense from the magazines those pills required at that time. In addition, it is contemplated that various magazines can only be activated at particular times in the day so that a pill cannot be dispensed except at the times prescribed for the patient.

10 Claims, 15 Drawing Figures

ARTICLE DISPENSING APPARATUS FOR SELECTIVELY DISPENSING ARTICLES

CROSS REFERENCE TO RELATED APPLICATIONS

This application is a continuation-in-part of co-pending application Ser. No. 608,785, filed Aug. 28, 1975 now abandoned.

FIELD OF THE INVENTION

This invention relates to article dispensing apparatus, and more particularly, to an apparatus for selectively dispensing a plurality of different type pills.

U.S. Pat. application Ser. No. 608,643 entitled "Electronic System For Article Dispensing Apparatus" and filed concurrently herewith in the name of W. L. Christensen is related to this application and includes claims directed to the electronic system described herein.

BACKGROUND OF THE INVENTION

Traditional drug distribution techniques in nursing homes and hospitals suffer from a number of significant problems which may result in poor patient care and an increase in cost to the patient or the hospital. In the filling of a typical prescription, the pills are packaged in a container with a label giving among other things the name of the patient and the number of times a day the pill is to be taken. The number of pills in the container is generally sufficient to meet the patient's needs for several days. In nursing homes and hospitals, it is not uncommon for a particular patient to be prescribed several different types of pills with different combinations of those pills to be dispensed at a different time of the day. It is up to the nurse to be sure that the correct pills are dispensed at the correct time and that the nurse chart for each patient what pills were dispensed when. Often, even though it is poor practice, the person dispensing pills in a ward will dispense pills to all of the patients in that ward after which he or she will chart from memory what pills were dispensed to what patient.

Such traditional dispensing methods suffer from a number of disadvantages. It has been estimated that as much as 18% medication errors occur in such methods. Further, especially with dangerous drugs, pilferage remains a major problem. Also, if the patient is taken off a particular drug, he must bear the cost of all of the pills which were packaged in the container for him, since they cannot be returned to the pharmacy. This results in a large amount of waste, greatly increasing the cost to both the hospital and the patient.

In order to overcome the problems associated with traditional medication dispensing methods, a unit-dose procedure has been initiated in many hospitals and nursing homes. In unit-dose, the particular dose of a particular pill to be taken by the patient at a given time is packaged individually in dispenser packs or trays which are labeled for each patient. The key advantages of the unit-dose method over traditional drug distribution systems include minimizing the medication handling from the time it is packaged by the pharmacy until it is taken by the patient, as well as eliminating the time required at the nursing home or hospital for counting and pouring the prescribed dosage of a particular medication. Also, by packaging each dose in a clean container all doses not used may be returned to the pharmacy and reused. Such packaging, because it does minimize handling, also minimizes the chance of contamination of the medication. Such unit-dose procedure has been favorably received by hospitals and nursing homes since it minimizes the nursing time spent in preparing medication. Also, it cuts down the drug cost to the patient, since he is only charged for what he receives, and it increases the degree of accounting and reliability, which in turn decreases pilferage and mistakes.

However, unit-dose procedures as they are now carried out, suffer from a number of disadvantages which for many hospitals and nursing homes make the procedures economically prohibitory. Unit-dose packaging equipment is expensive, and much more time is required on the part of the pharmacist to repack the prescribed pills into unit-dose containers. Many unit-dose systems now require delivery of medication to the nursing home or hospital wards at least once a day, and as many as four times daily to cover emergency situations. Major drug companies are now making available their high volume pills in unit-dose packages, but it is impossible, from a manufacturer's viewpoint, to have all variations of doses premade that a physician may desire. Also, the pharmacist must prepare the doses required for the patient at a particular time. Thus, the increased efficiency and reliability obtained from unit-dose procedures must be paid for in increased pharmacy costs.

Automatic dispensing apparatuses have, of course, been used for dispensing a wide range of materials. Pill dispensers which in one way or another dispense a single dose of a particular pill are also known. For example, Gayle U.S. Pat. No. 3,227,127 discloses a pocket size pill dispenser which dispenses a pre-determined number of pills at a particular time. The dispenser contains a time indicating means to ensure that the patient does not miss a dose or take a double dose of the prescribed pills.

For narcotic pills, locking dispensers have been devised in which a dose can be dispensed only by authorized personnel. For example, Cantu et al, U.S. Pat. No. 3,206,064 discloses a narcotic dispenser into which is inserted a tablet magazine containing a number of pills, and which are dispensed one at a time by pressing a plunger after the magazine has been unlocked. Such devices are a step in the right direction for minimizing mistakes and preventing pilferage, but they do not lend themselves to the servicing of a nursing home or a hospital ward, where generally several pills must be dispensed to each patient, and there are a large number of patients who must be serviced at each nursing station.

It is thus apparent that there is a need for an apparatus and method of filling a patient's prescription in unit-dose quantities which minimizes time and cost for both the pharmacy and the hospital. Also, the apparatus and method at the time of dispensing should lend itself to accounting for all of the pills dispensed, so as to minimize mistakes and pilferage. Since many patients are prescribed more than one pill at a given time, it is also required that the method and apparatus have the capability to dispense a number of different type pills.

Utilizing the dispensers of Gayle or Cantu et al, it is apparent that a large amount of both pharmacy and nursing time would be required to individually fill and individually dispense a separate dose from individual dispensers for every different type pill required by each patient.

Good hospital and nursing care practice also contemplates discretion on the part of the nurse with regard to whether or not all of the pills prescribed at a particular time should actually be dispensed to the patient. For example, if the patient were prescribed a heart medication such as lanoxin, it is good and accepted practice that such a pill should not be dispensed if a patient's pulse is below 60. Thus, it is essential that any unit-dose method have built into it the ability to select which of the pills prescribed should actually be dispensed.

It is thus an object of this invention to provide a method and apparatus for dispensing pills in which a prescribed unit-dose of more than one type pill may be quickly dispensed.

It is a further object of this invention to provide an apparatus and method which will allow the person dispensing the pills to select those pills which are required at a particular time.

It is another object of this invention to minimize the amount of time required for filing prescriptions in unit-doses.

It is another object of this invention to eliminate pilferage, in that the doses can only be dispensed by authorized personnel.

it is a further object of this invention to provide a high degree of reliability and accounting, by allowing the pills to be dispensed only at times contemplated, and to lend itself to easy charting of the pills dispensed, or alternatively to automatic charting.

SUMMARY OF THE INVENTION

These and other objects are accomplished by providing an article dispensing apparatus which may selectively dispense a plurality of dissimilar articles, each article being contained in a separate insertable magazine or cassette, and each magazine having a plurality of rotatable compartments. The magazines, upon insertion into the dispensing apparatus, are aligned along a substantially vertical axis. Each magazine has an opening over which a compartment of a magazine may be rotated to dispense the article contained in that compartment. By vertically aligning all of the openings in each of the magazine, the article can drop through all of the openings into a dispensing container. The magazines may be individually activated, so that only those articles contained in particular magazines are dispensed, thereby allowing the person dispensing the articles to select those pills that he or she chooses to dispense.

Further, it is contemplated that the magazines after filling, are sealed and locked, and that the rotatable compartments are locked so that they cannot be manually rotated. The compartments are unlocked by properly inserting the magazine into the dispensing apparatus, which in turn can only be operated by authorized personnel. Further, it is contemplated that each magazine may be designed to be actuated only a particular time of the day, so as to prevent the erroneous dispensing of pills at improper times.

FIGS. 10 through 16 are directed to a further embodiment of the dispensing apparatus including the dosage containing magazines, in which:

FIG. 10 is a fragmentary front view of the housing structure and dosage containing magazines.

FIG. 11 is a sectional view with portions in plan taken essentially through 11—11 of FIG. 10.

FIG. 12 is a fragmentary plan view of a dosage containing magazine shown positioned between a pair of key solenoids for the purpose of releasing the magazine cover.

FIG. 13 is an enlarged fragmentary sectional view taken through 13—13 of FIG. 11.

FIG. 14 is an enlarged fragmentary sectional view taken through 14—14 of FIG. 11.

FIG. 15 is an enlarged fragmentary sectional view taken through 15—15 of FIG. 11.

DETAILED DESCRIPTION OF FIGS. 1-7

Figure 1:
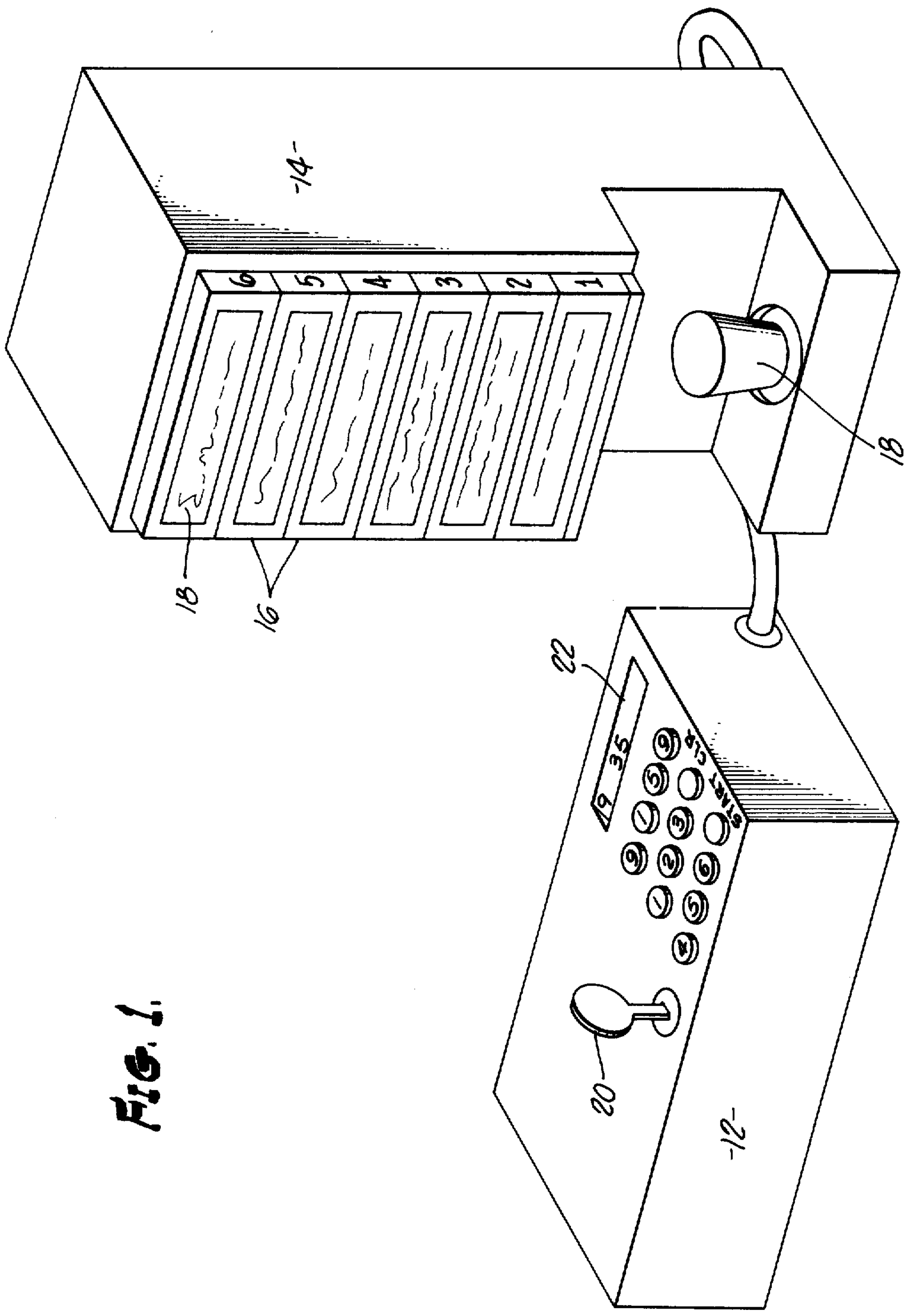
FIG. 1 shows a dispensing system for selectively dispensing pills.

Turning first to FIG. 1, a dispensing system particularly suited for selectively dispensing pills in a hospital or a nursing home is shown. The system contemplates three major components, a control means 12, a dispensing apparatus housing 14 and a set of magazines 16. At the bottom of the dispensing apparatus housing 14 is placed a cup 18 into which the pills contained in the magazine drop during dispensing. The cup may then be given directly to the patient so that handling and the possibility of contamination by hospital personnel is practically eliminated.

The apparatus shown in FIG. 1 has the capacity of holding six magazines, each magazine having eight compartments. Seven of the compartments may be filled with a unit-dose of a particular medication with the eight compartment aligned over the opening in the bottom of the magazine. Of course, it will be understood that the apparatus may be designed to contain a greater or lesser number of magazines, and each magazine may be designed to contain a greater or lesser number of compartments. However, for most nursing home and hospital applications, it has been found that six magazines, containing six different pills, is sufficient to meet the requirements of most patients at any particular time. As will be discussed in greater detail later, the magazines are designed to be snapped together and contain on the front label 18, among other things, the name of the patient, the medication contained in the magazine, the dosage, and the time prescribed for dispensing the pill.

The magazines are numbered 1 to 6, the location corresponding to the bottom two rows of keys shown on the control system in FIG. 1. The magazines, when stacked six high and snapped together, may be easily carried as one unit into the dispensing apparatus 14, and slid into the dispenser with a minimum of time and effort.

Further, to minimize the dispensing of a wrong pill at a wrong time, it is contemplated that the magazines will be designed to dispense only at the proper times of the day. Each magazine is color coded to represent dispensing times, the color corresponding to the top set of keys on the control unit. The magazines to be used for a given patient at a particular time are snapped together so they can be easily taken out of the storage cabinet and inserted into the dispensing apparatus.

For example, a patient who is prescribed five different type pills four times a day, with a sixth pill whenever needed, would be dispensed 21 magazines. Five of the magazines, color coded for example green, are to be dispensed at 9:00 A.M. The 9 button on the keyboard as shown in FIG. 1 is also color coded green. Five magazines containing the 1:00 P.M. medication are color coded, for example white, corresponding to the white 1 button on the keyboard. Likewise, 5:00 P.M. medication may be color coded, for example orange, while the 9:00 P.M. medication is color coded, for example blue, these colors corresponding to the 5 and 9 buttons on the keyboard. A fifth type magazine color coded, for example red, may be filled with a pill which can be dispensed at any time.

Thus, at 9:00 A.M., the nurse will take out the five green color magazines and, if needed, snap the red magazine to it and insert them into the dispensing apparatus. By turning key 20, as shown in FIG. 1, the power is turned on and the 9:00 A.M. green button is activated. The nurse then selects those pills which should be dispensed at that time, by pulsing each of the numbers corresponding to the position of the magazines in the dispensing apparatus. The keyboard contains a digital read-out 22 which indicates exactly what magazines were activated and indicates the time of dispensing. If a mistake is made, it can be corrected by pulsing the clear button (Clr as shown in FIG. 1) prior to activating the start button. By pulsing the start button, the compartments are caused to rotate with approximately two to five seconds delay between magazines, each magazine activated dispensing a unit-dose of medication into cup 18.

However, if the operator mistakenly takes the 1:00 P.M. pills instead of the 9:00 A.M. pills, which in many cases will not contain the same pills or may contain different unit-doses, the magazines will not dispense. The only magazine that will dispense at any time is the red cassette, which contains pills which may be dispensed at any time. Thus, the only way an operator can mistakenly dispense the wrong pills at the wrong time, is to both select the wrong magazine from the storage cabinets and then also pulse the wrong time of day in dispensing the medication. Even this error can be eliminated by having a timing device, which preferably would include a digital clock showing the time of day on the digital read-out and which would allow activation of only the proper magazine at a particular time. Thus, where pills should be dispensed four times a day at 9:00 A.M., 1:00 P.M., 5:00 P.M., and at 9:00 P.M., 9:00 A.M. cassettes could only be activated, for example, between the hours of 8:00 and 10.00. Likewise, the 1:00, 5:00 and 9:00 magazines could likewise only be activated within a certain time range.

Because of the digital read-out and the approximate two to five seconds delay between magazine activation, the nurse can readily chart those pills which have been dispensed at a particular time while the pills are being automatically dispensed. A short delay between magazine activation is contemplated to prevent the clogging of the exit chute which could occur if too many pills were caused to drop at one time. However, where the exit chute is relatively large in comparison to the size of the pills, it will be understood that all of the magazines could be activated simultaneously.

Also, it will be understood that connected to the digital read-out may be a permanent recording unit which will automatically record the pills dispensed, thus avoiding any error in charting the dispensed medication. Also, contemplated for the system to avoid the improper dispensing of pills even by authorized personnel is the use of a code for each authorized personnel which must first be pulsed, or a magnetic card to activate the dispenser. In this method, every pill dispensed can be traced back to the particular authorized individual dispensing it.

Alternatively, instead of a keyboard, an optical reader may be utilized, which, in conjunction with punch cards or a machine readable form, with automatically dispense the prescribed medication as shown on the card or form to further eliminate the possibility of human error.

Figure 2:
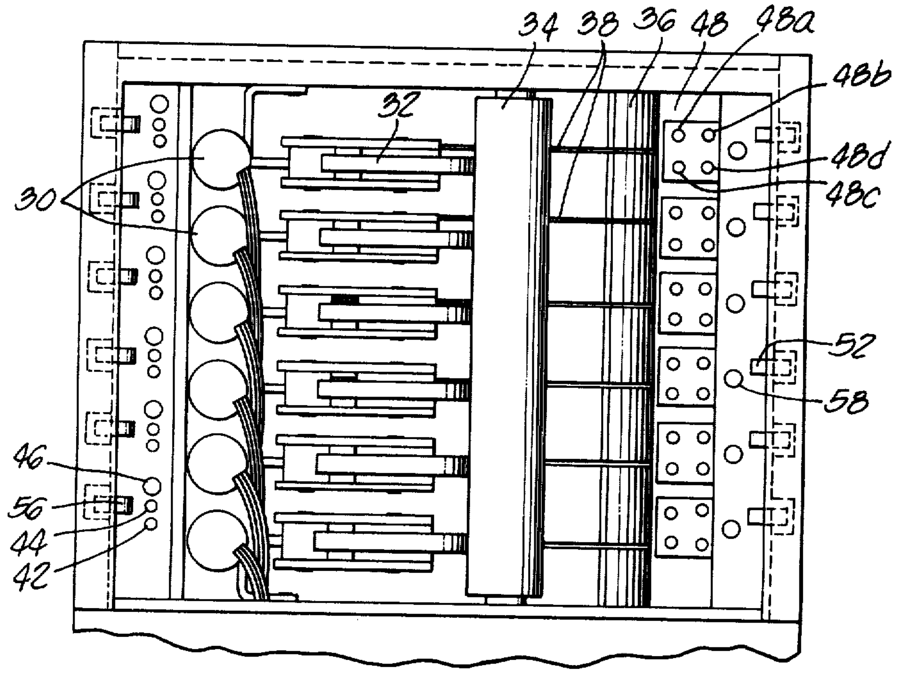
FIGS. 2 and 3 show a front view and a top view of the dispensing apparatus with the magazine removed.
Figure 3:
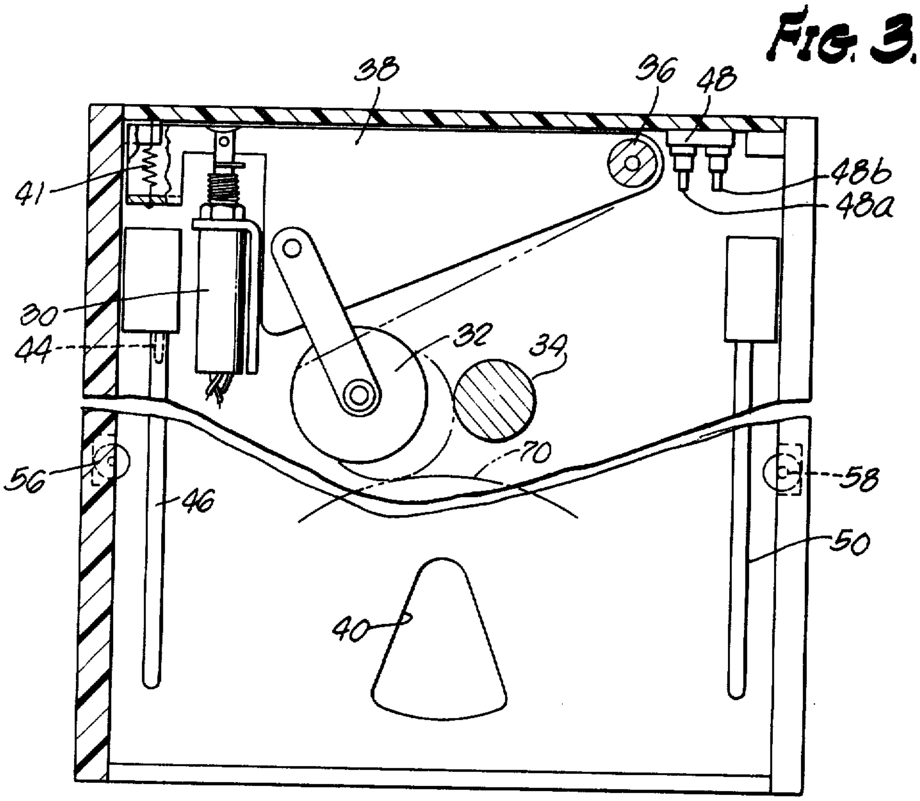

Turning now to FIGS. 2 and 3, there is shown a front view and a top view of the dispensing apparatus with the magazines removed.

Solenoids 30 are connected to the control means, and are activated when the digit corresponding to each solenoid is pulsed. The solenoid 30 moves the corresponding drive wheels 32 into frictional engagement with a master drive cylinder 34 which is connected to a motor, not shown, activated upon turning the power on. Support rod 36 is connected to pivotable brackets 38 which support and move drive wheel 32 into and out of engagement with the master drive cylinder 34 as shown by the phantom drawing and arrows in FIG. 3. When the position of the drive wheel 32 is in contact with master drive cylinder 34, the drive wheel is also in frictional engagement with the magazine inserted into the dispenser so as to rotate the compartment. Upon rotation of the magazine compartment one-eighth of a turn so that the next compartment is in alignment with opening 40, the solenoid is deactivated. Upon deactivation, the drive wheel 32 disengages from the magazine and master drive cylinder 34 by pivoting of bracket 38 rearward, the bracket being biased in that direction by spring 41. The switching means causing disengagement of the drive wheel upon alignment of a magazine compartment over the opening will be more fully explained in the discussion of the magazine itself, but the magazine switch is in electrical connection with the solenoid via plugs 42, 44 and 50 into which the magazines are plugged. Plug 50 upon complete insertion also releases a spring biased lock in the magazine which prevents manual rotation of the magazine compartments by unauthorized personnel. Although a simple rod 50 is shown for releasing the lock, it will be understood that a key shaped configuration corresponding to a key lock in the magazine could also be used. In this case, it may be advisable to provide a separate plug for electrical connection instead of utilizing member 50 for the dual function of electrically connecting the magazine and unlocking the rotatable compartments. Electrical plug devices 48, one for each magazine, contain four inwardly movable switches 48A - 48D. Each of the switches 48A is in series and logically or'ed with an hour (e.g., 9:00 A.M.) signal, and each of the switches 48B is in series and or'ed with another (e.g., 1:00 P.M.) hour signal. The switches 48C and 48D are connected in a similar manner and Ored with respective 5 p.m. and 9 p.m. time signals. Upon movement inward of one of the switches 48A - 48D for each cassette, a circuit is controlled so that if the corresponding time signal exists, the approximate solenoids will activate to drive the cassettes. As will be discussed with respect to the magazine, each switch 48A - 48D will switch a different set of circuits so that only by pushing the proper time can that particular magazine be activated. Guide 46 is utilized to ensure proper horizontal alignment of the magazines, while members 56 and 58 in the dispenser correspond to notches in the magazines to further ensure proper vertical alignment.

FIGS. 4 through 7 depict the magazine or cassette which is to be inserted into the apparatus shown in FIGS. 2 and 3.

Figure 4:
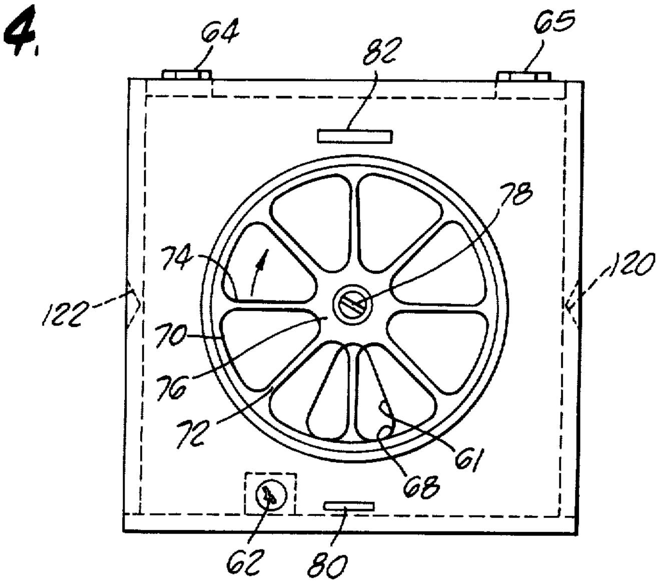
FIGS. 4–7 show the magazine or cassette insertable into the apparatus of FIGS. 2 and 3.
Figure 5:
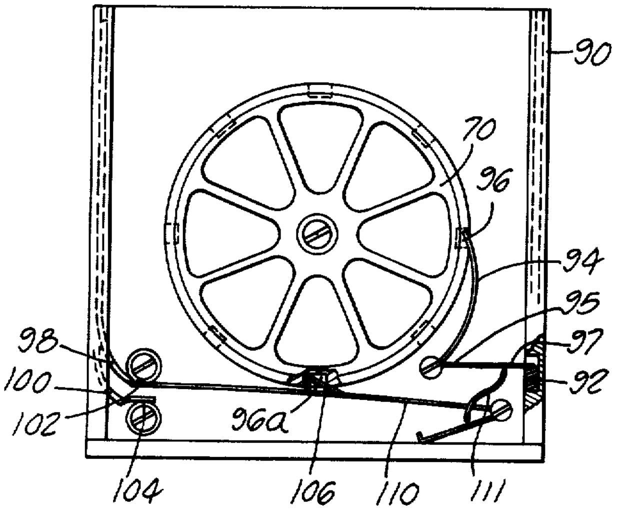

FIG. 4 is a top view of the magazine, which contains a cover 60 which may be made transparent in the center section so that the pills may be viewed when locked to determine what type pills, and how many are contained in each magazine. For aesthetic purposes, it is contemplated that the cover will be opaque at the outer edges, or an additional undercover at the borders may be used to hide the switching circuitry as can be seen in FIG. 5. Opening 61 allows pills dispensed from above to drop through the cover. The cover may be unlocked at lock 62, and is hinged at 64 and 65 so that the pharmacist, or other authorized personnel filling a prescription, may fill each compartment with a unit-dose prescribed for the particular patient. The compartment aligned between the top opening 61 and bottom opening 68 is not filled. In the preferred method of dispensing pills, it is contemplated that seven compartments will be filled, each compartment containing a unit-dose of one particular pill which is to be dispensed to the patient at one particular time of the day. This would meet the requirements of the patient for at least four different days with three backup pills for emergency situations where the patient may require an additional dosage, or may have spit out the first dose. Thus, by filling a separate magazine for each different pill for each different time of the day, the patient's needs for at least four days can be filled at one time. This eliminates the daily dispensing by the pharmacy, and emergency dispensing where a patient requires additional dosages. From the pharmacy's viewpoint, since many patients are prescribed standard pills in standard dosages, unit-doses of a large number of pills may be placed in the magazines in advance, and when such a dosage is prescribed for a particular person, a label may simply be typed on the front of the magazine and sent to the hospital or the nursing home. Also, where certain medication is no longer needed by a patient, and the medication contained in a magazine has not been fully dispensed, it may be returned to the pharmacist, who will fill the empty compartments so the magazine can be used by another patient. This may be done, since at no time have any of the pills returned been touched from the time the cover was first locked by the pharmacist. It is contemplated that the rotatable unit 70 having sidewalls 72 and 74 extending from the center section 76 to form compartments may be molded of an inexpensive plastic which will in no way contaminate the pills it contacts. Alternatively, throw-away rotatable units, easily removed by unscrewing screw 78 may be used where certain drug regulations may require it. Further, it is contemplated that the transparent center section of cover 60 be made of light resistant material, so that the pills are not degraded by light during storage. Slots 80 and 82 are openings which are utilized to snap the magazines together so that all of the pills prescribed for a patient at a particular time may be inserted into the machine at one time as previously discussed.

Turning to FIG. 5, a top view of the magazine with the cover removed is shown. Notches 96 are on the outside rim of the movable compartments to serve as both a locking means and a switching device. Upon insertion of a magazine into the dispensing apparatus, rod 50 as best seen in FIG. 3 is inserted into opening 90 which when fully engaged presses spring 92 inward. Upon the movement of spring 92, locking mechanism generally designated 94 and which is depicted in the locking position in notch 96 is released. The locking mechanism 94 is caused to be pivoted outward, away from the rotatable compartment at the pivot point of screw 95, so that the compartment can be moved upon engagement with drive wheel 32 shown in FIGS. 2 and 3. Locking mechanism 94 is a rather heavy-gauge steel, so that it is almost impossible to override the lock by manually rotating the compartments without first disengaging it. Opening 90 may be configured in a key-lock configuration corresponding to a key-shape which member 50 as shown in FIG. 3 may be made, to further ensure that an unauthorized person cannot insert an implement into opening 90 to release lock 94 and thereafter manually rotate the compartments to dispense the pills. Part 97 which contracts the spring to release the lock also serves to electrically connect the magazine with the dispenser since part 50 also serves as a plug and is connected to the control circuitry. Of course a second opening in the magazine corresponding to a separate plug unit in the dispensing apparatus may be employed so that part 50 of the dispenser need not serve as both an unlocking mechanism and an electrical contact.

Upon complete insertion of the magazine into the dispensing apparatus, besides electrical connection of contact 97 with the dispensing apparatus, electrical wiring 98 and 100 is also connected in the magazine via contacts 102 and 104 respectively. When the compartment is aligned over the opening, member 106 will seat into notch 96 causing electrical contact with contact 102, in which case the circuitry is in the off position. Upon reactivation of the solenoids, the compartment is caused to rotate, causing member 106 to move out of notch 96 and ride along the outer rim of the rotatable compartment until it seats in the next notch which corresponds to alignment of the next compartment over the opening. While it is riding along the compartment, it is in contact with electrical contact 104 which in turn allows the solenoids to maintain the drive wheel in frictional engagement with the rotatable compartment. Upon alignment of the next compartment over the opening, member 106 will seat into the next notch of the outer rim of the compartment causing member 110 to again contact electrical contact 102 thereby deactivating the solenoid causing the drive wheel to pivot away from the rotatable compartment. The circuit is completed from 110 through wire 111 to member 97 which is in electrical contact with member 50 of the dispensing apparatus.

Figure 6:
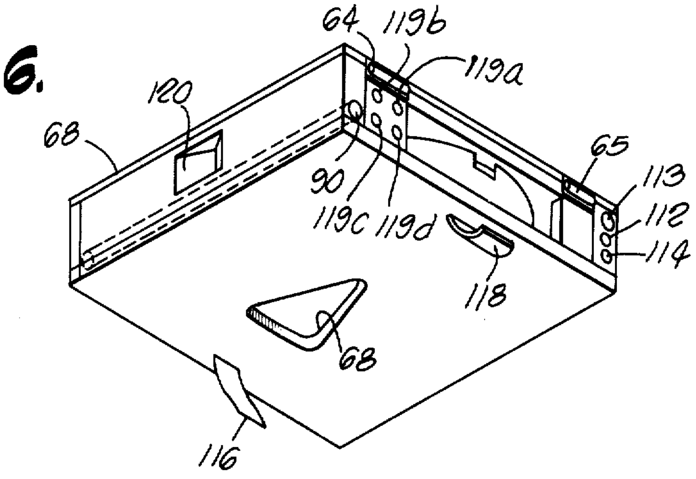

FIG. 6 is a perspective of the back underside of the magazine with the cover on, showing hinges 64 and 65 and the back portion of rotatable compartment 70 which is engaged by the drive wheel upon plugging of the magazine into the dispensing apparatus. Opening 90 is inserted into key 50 for releasing the locking compartment as well as electrically connecting it. Opening 113 has inserted into it guide rod 46 which, in combination with member 50, properly aligns the magazine. Openings 112 and 114 are connected to plugs 42 and 44 of the dispenser which, in turn, are connected to wires 98 and 100. Members 116 and 118 correspond to the openings in the top of the magazines 80 and 82 so that magazines may be snapped together. Alternatively, the magazines can include molded pins and openings to enable one magazine to snap onto the next. Openings 68, about the size of or slightly larger than one of the compartments, allow the pills to drop through the magazine when the compartment is rotated over the opening. When the magazines are snapped together, the openings in the magazines are aligned so that the pill from the magazine will drop through the opening in both the top and bottom of that magazine. Notch 120 is utilized to properly vertically align the magazines, notches 120 and 122 having seated in it units 56 and 58 of the dispensing apparatus as best seen in FIG. 3 when properly inserted. Openings 119*a* through *d*, upon insertion into the dispensing apparatus, correspond with switches 48 A to D as best seen in FIG. 2. Depending upon what time a particular magazine is designed to dispense, the number and location of the openings will vary. For example, if the magazine is one from which pills may be dispensed at any time, all of the openings 119 *a* to *d* will be present so that none of the switches 48 A to D will be pressed inward to switch off a particular circuit. If the magazine is only to dispense at 9 a.m., only opening 119*a* will be present so that switches 48 B, C and D will be pressed inward switching off currents activated by pulsing the 1 p.m., 5 p.m. or 9 p.m. buttons on the control means. Likewise, in 1 p.m. activated magazines, only opening 119 *b* will exist, while for 5 p.m. magazines there will be an opening at 119*c* and for 9 p.m., and opening at 119 *d.*

Figure 7:
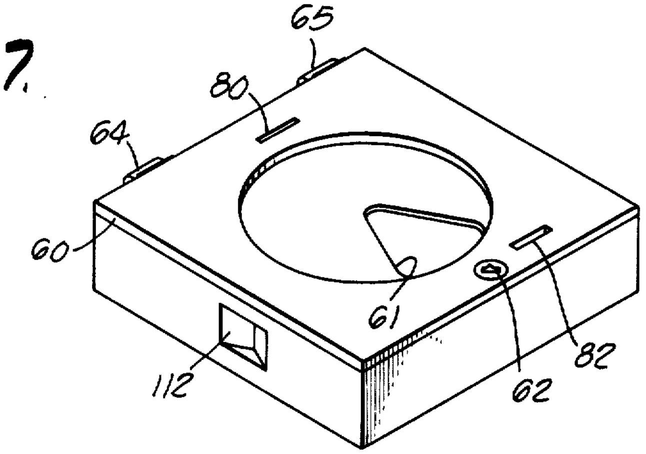

FIG. 7 is a front top view of the magazine showing again, the openings 80 and 82 which allow the magazine to be snapped together and a notch on the opposite side 122 to ensure proper vertical alignment. Key 62 locks the cover after filling of the magazine, with that portion of the cover over the rotatable compartment being transparent so that it can be seen how many compartments are full. Also, there is an opening 61 in the cover which is in vertical alignment with and corresponds in size to opening 68 at the bottom of the cassette and which permits pills being dispensed from the magazine above to drop completely through the magazine. The opening 40 (FIG. 3) of the dispensing apparatus below the magazines should be larger than the openings 68 (FIG. 6) in the bottom of the magazines to prevent contamination of the dispensing apparatus.

DETAILED DESCRIPTION OF FIGS. 8 AND 9

Figure 8:
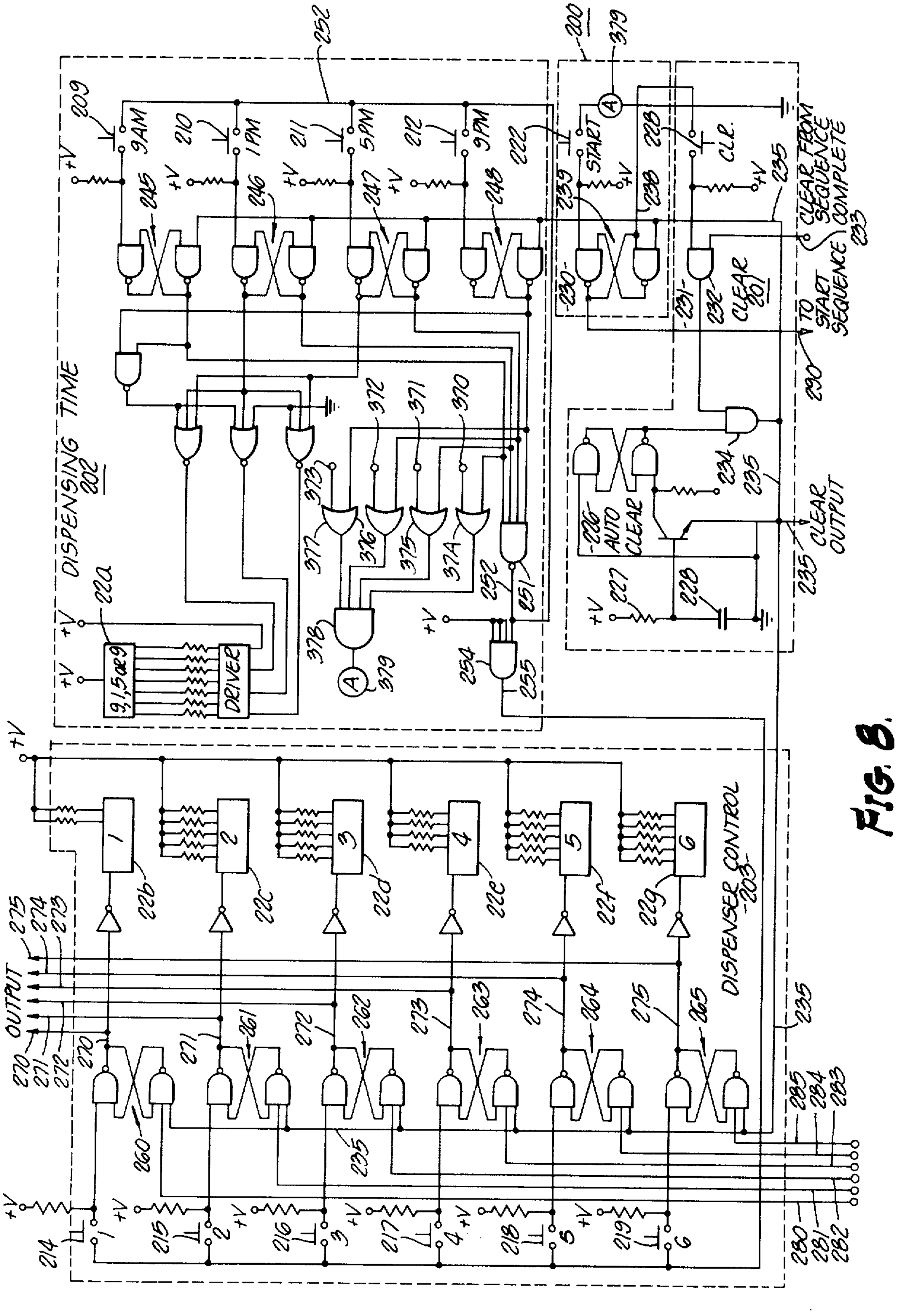
FIGS. 8 and 9 show the electronic control means for entering dispensing time and other signals into the system.
Figure 9:
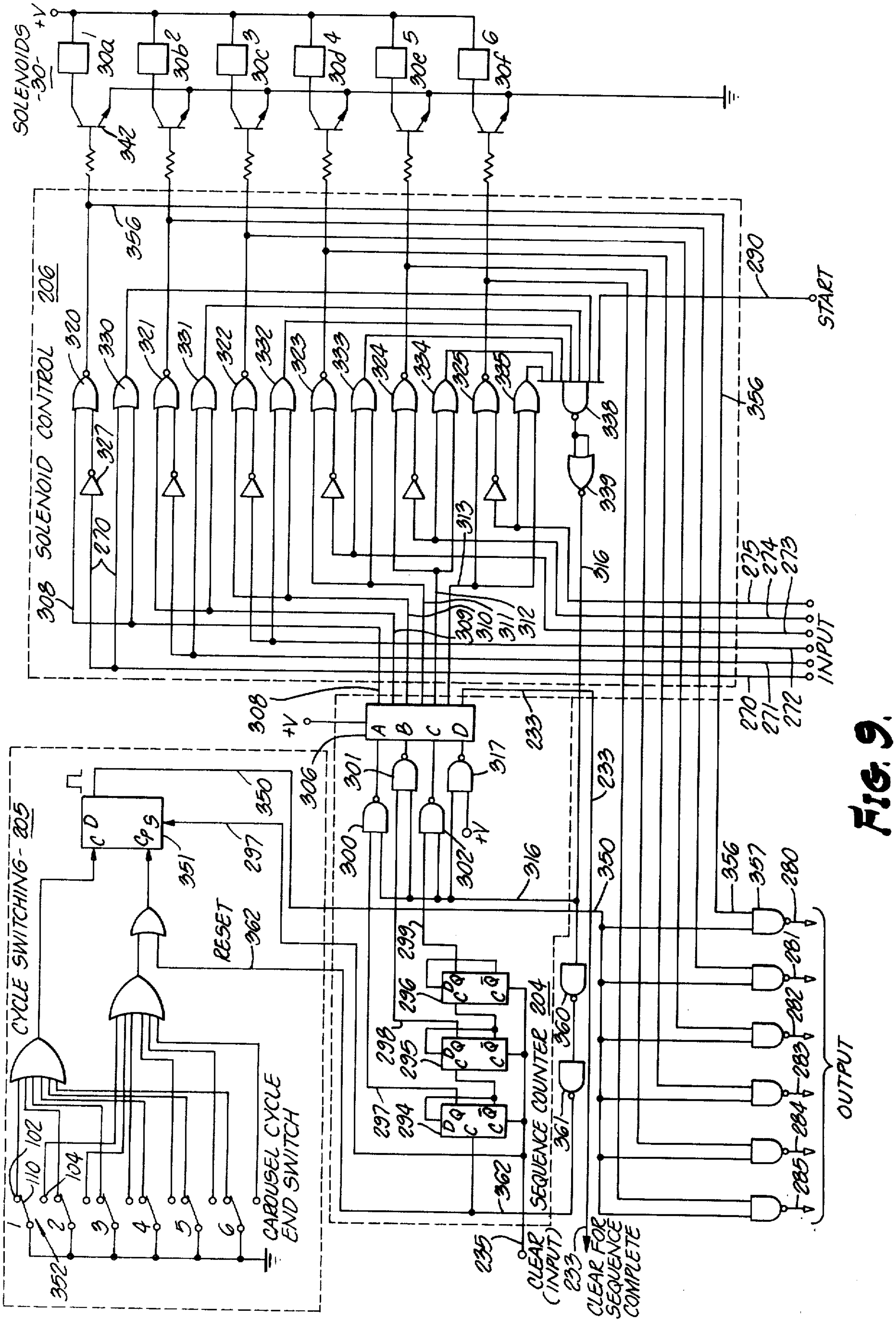
Figure 10:
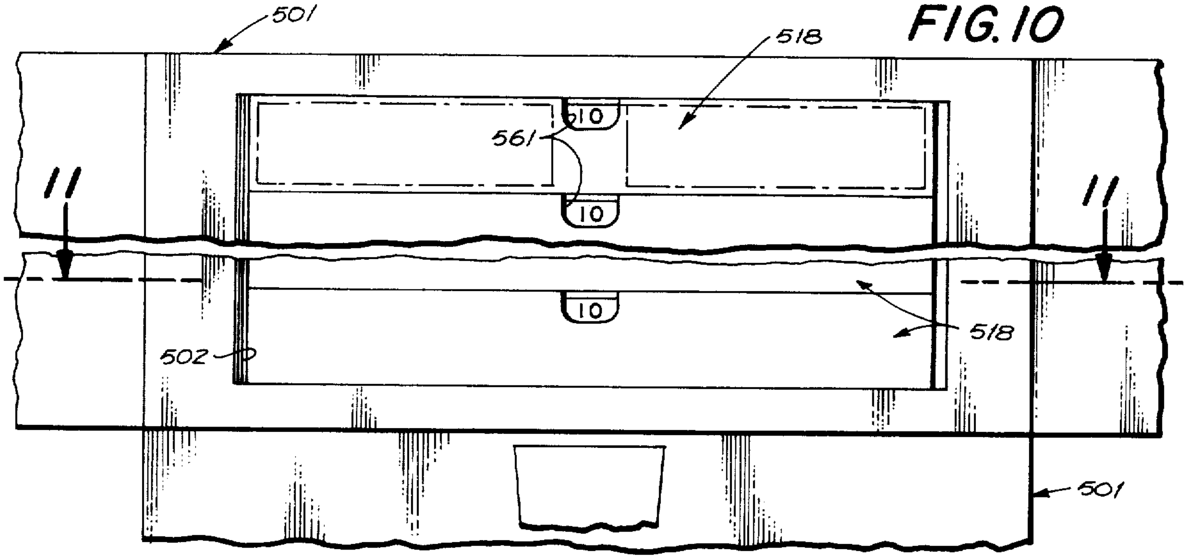
Figure 11:
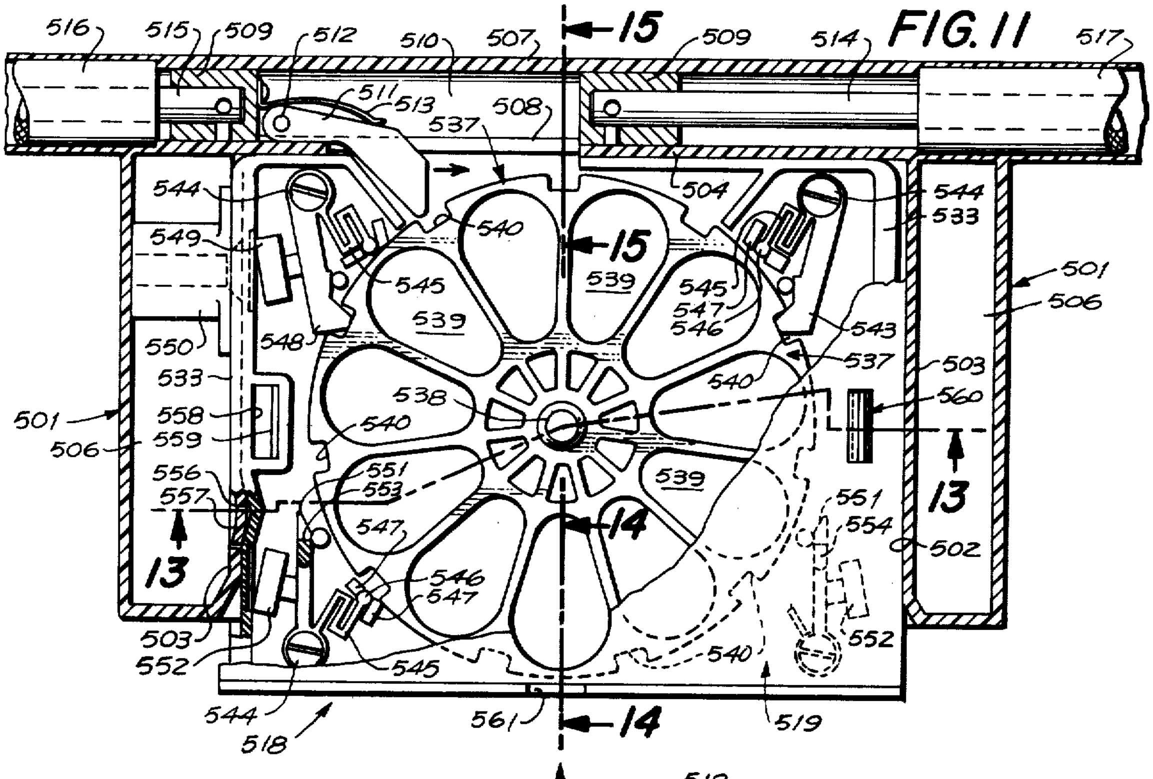

Turning now to the electronic control means or system for entering dispensing time and other control signals for the dispensing system, the electronic system as shown in FIGS. 8 and 9 illustrate a start section 200, clear section 201, dispensing time section 202, dispenser control section 203, sequence counter 204, cycle switching section 205, solenoid control section 206, and solenoids 30. Like reference numerals are used in FIGS. 8–9 to designate components which have already been identified. The system shown in FIGS. 8–9 is housed within the control means 12 of FIG. 1, with the exception of the solenoids 30 (FIG. 2), and the switches 102, 104 and 110 of the cassettes (FIG. 5) which are used in the cycle switching section of FIG. 9.

As noted earlier, the control means 12 includes a plurality of program switches or buttons which define the operation of the dispenser, and a numerical display 22 which illuminates as the program buttons are depressed to thereby display the program sequence which the dispenser will follow. The time buttons for 9:00 a.m., 1:00 p.m., 5:00 p.m., and 9:00 p.m. are identified as switches 209 through 212 in the dispense time section 202 in FIG. 8 and correspond with the buttons labeled 9, 1, 5 and 9 in the control means 12 of FIG. 1. The program switches also include dispenser control buttons numbered 1 through 6 and identified as switches 214 through 219 in the dispenser control section in FIG. 8. These switches correspond with the buttons numbered 1 through 6 of the control means 12. A start button 222 and a clear (CLR) button 223 are provided in the respective start section 200 and clear section 201.

Considering the clear section 201 first, the name is a three-part section (providing automatic clear, manual clear, and program complete clear) which generates plus or minus (or true or false) pulses as required by various other sections of the control system to clear any programming, except start programming, and to set the various circuits in a mode of readiness for accepting a dispense program. A first part 226 of the clear section 201 is a time delay pulse generator including a resistor 227 and capacitor 228 signal source to develop an automatic clear pulse of short duration when power is applied to the circuit. As noted earlier, power is applied to the circuit when the key 20 of FIG. 1 is turned on, and this key operates a suitable power switch (not shown) to supply power to the control system. The automatic clear pulse provided by 226 serves to clear and place in a ready state all portions of the circuit each time the system is turned on. A second part 230 of the clear section 201 comprises the CLR button or switch 223, and functions to clear the system whenever the clear switch 223 is depressed, except for a period of time after the start switch 222 has been depressed and before the dispenser cycle has been completed. A third part 231 of the clear section 201 comprises an And gate 232 which receives a sequence complete clear signal from an input line 233 of the sequence counter 204 shown in FIG. 9 to be described later. Any one of these parts 226, 230 or 231 of the clear section 201 functions to generate a clear pulse through an And gate 234 to provide a clear pulse (a minus or false signal) on a clear output line 235.

The CLR switch 223 is deactivated during the pill dispensing cycle by removing the minus reference on a line 238 to the right-hand side of the clear switch 223. This is accomplished by using the output of an R-S flip-flop 239, which is controlled by the start switch 222, as a ground or positive reference source on line 238 for the clear switch 223. In this regard, it should be noted that the clear pulse line 235 normally is at a positive or true level, and the clear pulse is a minus or false pulse. Once the dispenser cycle has been started, the gate 232 causes the gate 234 to provide a clear pulse (minus signal) on the line 235 which switches the state of the flip-flop 239 (the output of which is normally minus) to provide a positive output on the interlock or reference line 238 for the clear switch 223. Since the line 238 normally is minus (which will allow the clear switch 223 to provide a clear pulse), a positive or plus level on 238 from the set flip-flop 239 essentially deactivates the clear switch 223 and prevents it from clearing the system while in the dispensing cycle made so as to allow the cycle to be completed without interruption as, for example, by inadvertent depression of the clear switch 223.

Turning now to the dispensing time section 202, the first program sequence entered into the system is the dispensing time (9:00 a.m., 1:00 p.m., 5:00 p.m. or 9:00 p.m.) and is accomplished through operation of one of the switches 209 through 212. These switches 209 through 212 are interconnected through F-S flip-flops 245 through 248 which control the illumination of one display digit of a seven-segment LED display 22*a*. The digits displayed, 9, 1, 5, or 9, correspond with the appropriate time as entered by pressing any one of the switches 209 through 212. This time entry switching system incorporates an electronic interlock so as to deactivate any further activating of a time switch once any one of the four time switches 209 through 212 has been activated. The interlock includes a four input N and gate 251 which receives the output control signals from the flip-flops 245–248 associated with the respective time control switches 209–212, and provides an output on a line 252, which output is plus or true any time one of the flip-flops 245–248 is activated for driving the dispensing time display 22 *a*. This plus or true signal removes the minus or false reference from line 252 required at the right-hand side of the time control switches 209–212. This interlock feature prevents any other time switch 209–212 from being effective once one of these switches has been depressed. The outputs of the flip-flops 245–248 also can be used to prevent use of cassettes scheduled for one time (e.g., 9:00 a.m.) at another time (e.g., 5:00 p.m.). The signal on the line 252 also is inverted by a Nand gate 254, used as an inverter, to provide a reference voltage for the dispenser control switches 214 through 219 in the dispenser control section 203 of FIG. 8 to be described subsequently. A minus or false reference, thus, is provided to the dispenser control switches for enabling activation thereof only after one of the time control switches 209–212 has been activated.

The second programming sequence of the control system involves the dispenser control section of 203 of FIG. 8. This section, as noted above, receives its minus or false reference from the gate 254 by line 255 to thereby allow switches 214–219 to activate entry of the cassette program. The switches 214 through 219 are connected with respective R-S flip-flops 260–265 in a manner similar to the time switches 209–212 and flip-flops 245–248 of the dispensing time section 202. Any one or more of the switches 214–219 can be depressed to set its corresponding flip-flop 260–265. The outputs of the flip-flops 260–265 appear on output lines 270–275, respectively, and are inverted and applied to respective displays 22 *b* through 22 *g* which respectively display the digits 1 through 6. The output lines 270–275 are connected also to the solenoid control 206 of FIG. 9 for controlling the appropriate dispense routines (for activating the appropriate cassettes or magazines of the dispenser). The flip-flops 260–265 are cleared either by a clear pulse on the line 235 or these flip-flops are cleared individually from pulses received on respective input lines 280–285 from the solenoid control 206 of FIG. 9 which pulses indicate when each corresponding cassette has completed its dispense cycle as will be described later.

Once the control system has been programmed by the switches 209–212 to indicate time and by the switches 214–219 to indicate the cassettes which are to dispense pills at that time, the start switch 222 is depressed which sets the R-S flip-flop 239 of the start section 200 in FIG. 8. This flip-flop 239 then provides a plus or true output to line 238 in a manner similar to that previously described. This plus signal on line 238 deactivates the clear switch 223 by removing the minus or false reference on line 238, and also the plus signal on line 238 provides a start signal on an output line 290 to start the dispense sequence.

The start section 200, clear section 201, dispense time section 202 and dispenser control section 203 thus function as a programming subsystem for the overall control system. After the dispense sequence has been programmed, the actual dispensing of the pills from the various cassettes is controlled from the sequence counter 204, cycle switching circuit 205, and the solenoid activator 206 of FIG. 9, once the key switch is turned on and the start button depressed.

Turning first to the sequence counter 204, the same receives a clear pulse from line 235 to set three dual-D flip-flops 294 through 296 to a zero state to cause the counter to start at zero. These three flip-flops 294–296 are arranged as a ring counter. Each output 297–299 of the respective flip-flops 294–296 drives one input of a dual input N and gate 300–302, respectively. These Nand gates each have another input and are gated by the start and solenoid control circuits in a manner described subsequently. The outputs of these gates 300–302 drive the inputs of a sequencer 306 which produces a minus or false output signal on each output line 308–313 corresponding to the binary input to the sequencer so as to drive these lines which are connected to the solenoid control 206. The signals on the output lines 308–313 normally are plus or true, and one output line goes minus or false as the sequencer 306 sequences in converting the output signals of the flip-flops 294–296. Unless a plus or true signal is provided on input line 316 to the Nand gates 300–302, the sequencer 306 will not produce any minus output signals for controlling the sequencing of the solenoid activator 206. Thus, a minus or false signal on line 316 normally holds the gates 300–302, and a gate 317, off and effectively turns off the output (goes plus) of the sequencer 306.

Input clock pulses for the sequence counter 304 are derived initially from the start signal on line 290 to start the sequence, and subsequent clock pulses are derived from the solenoid control 206, in a manner to be described subsequently, each time a solenoid 30 *a* -*30 f* is deactivated.

The solenoid control 206 of FIG. 9 receives two input signals. One set of signals is on lines 270–275 from the dispenser control section 203 of FIG. 8 and the other set of signals is from the lines 308–313 at the output of the sequencer 306 of the sequence counter 204. The solenoid control 206 includes a plurality of Nor gates 320 through 325 for each of the solenoids 30*a* through 30 *f*. Each of these Nor gates receives signals on the lines 270–275 of the dispenser control section 203 to indicate which solenoid or solenoids are to be activated and signals on lines 308–313 from the sequencer 306 to indicate when a solenoid is to be activated. A positive or true signal is provided on one or more of the lines 270–275 if a respective solenoid or solenoids are to be activated, and a minus or false signal is provided if the solenoid or solenoids are not to be activated. The outputs on lines 308–313 of the sequencer 306 normally are all plus or true until a "start" signal on line 290 occurs or a sequence complete signal is generated as will be described subsequently. Considering the uppermost Nor gate 320, for example, the same receives inputs on lines 270 (through an inverter 327) and 308. The output of the Nor gate 320 normally is minus, and this output will not activate the solenoid 30 *a*. The line 308 normally is plus, and the line 270 normally is minus unless R-S flip-flop 260 in FIG. 8 has been programmed to dispense and the output of the inverter 327 normally is plus. When both inputs to the Nor gate 320 are plus, its output is minus, and its output is minus unless both inputs to the Nor gate are minus. Both inputs to the Nor gate 320 are minus when the line 270 is plus (indicating that the first cassette is to be activated) which, in turn, is inverted to minus by the inverter 327, and when the line 308 is minus indicating that the sequencer 306 has sequenced one time thereby causing its output line 308 to go from normal plus to minus.

The solenoid control 206 also includes a set of Or gates 330–335 which likewise have inputs connected to the lines 270–275 and the lines 308–313. The outputs of these Or gates 330–335 and the start signal line 290 are connected to the input of a Nand gate 338 which generates clock pulses and controls the sequence of operations in dispensing. The outputs of the Or gates 330–335 normally are plus inasmuch as each receives a plus input from the lines 308–313 from the sequencer 306 before the sequence commences. The start signal line 290 normally is minus, but goes positive when the start button 222 of the start section 200 described previously is depressed. The output of the Nand gate 338 normally is plus, but goes minus when the start pulse on the line 290 occurs. The minus output from the gate 338 is inverted by a Nor gate 339 to provide a positive signal on output line 316 which turns on the Nand gates 300–302 and 317 at the input of the sequencer 306 to enable the binary code from the flip-flops 294–296 to be gated into the sequencers 306, which, in turn, causes the first output line 308 to go minus. The start signal on the line 290 thus starts sequencing of the sequencer 306. As noted before, a minus signal on the line 308 and a plus signal on the line 270 causes the Nor gate 320 of the solenoid control 206 to provide a positive output. The Nor gate 320 thus supplies a positive signal to the base of a corresponding solenoid drive transistor 342 to activate or energize the solenoid 30 *a*.

When the solenoid 30*a* is energized, the corresponding cassette is turned a predetermined amount (typically, one-eighth turn) in the manner described previously. Once the cassette completes its movement, a plus or true signal is generated by the cycle switching circuit 205 at output line 350 of a flip-flop 351. The members 102, 104 and 110 of each cassette described previously comprise a momentary close switch 352 which provides gating pulses through Or gates (which eliminate contact bounce problems) to the input of the flip-flop 351. When one of these switches 352 opens and closes, the flip-flop 351 goes up and down to provide a pulse on the output line 350. This pulse, along with the plus signal from, for example, the output of Nor gate 320 of the solenoid control 206 which causes solenoid 30*a* to be activated is applied by a line 356 to the input of a Nand gate 357. The output of the Nand gate 357 goes minus on output line 280, and this output line 280 clears the first flip-flop 260 of the dispenser control section 203 in FIG. 8. When this flip-flop 260 is cleared, its display 22 *b* likewise is cleared, and the input on line 270 from this flip-flop 260 to the upper Nor gate 320 returns to the normal minus or false state. A minus signal on line 270 (inverted by inverter 327 to plus) along with the minus signal on line 308 from the sequencer 306 causes the Or gate 330 to produce a minus signal which, through gates 338 and 339, produces a minus clock signal on line 316 to turn off the input gates 300–302 and 317 to the sequencer 306. All outputs of the sequencer 306 then go plus. At the same time, the counter comprising the flip-flops 294–296 of the sequence counter 204 is clocked from the signal on line 316 through inverters 360–361, which serve as a delay line. When outputs from sequencer 306 go plus, the output of Or gate 330 goes plus. Inasmuch as the start signal on line 290 remains plus until the dispenser sequence has been completed, the next solenoid which has been programmed to be activated is energized in the same manner described previously. That is, the second output line 309 of the sequencer 306 goes minus to test the logic circuitry for the second solenoid 30 *b*, and if input line 271 is positive, this solenoid 30 *b* will be energized in the same manner explained above. If line 271 is negative (indicating that the appropriate cassette is not programmed to dispense) the solenoid will not activate but a sequence routine will occur. This process continues until all six solenoids 30 *a*–30 *f* have been sampled, and then a seventh sequence signal is generated as a "sequence complete" clear signal on an output line 233 from the sequencer 306. If any solenoid 30*a*–30*f* has not been programmed to dispense, the signal on the appropriate line 270–275 remains minus, and the system will automatically sequence one digit past this solenoid without activating this nonprogrammed solenoid.

The gates 320–325 and gates 330–335 comprise sets of logic gates (e.g., 320 and 330) for each of the respective solenoids 30*a*–30*f* and provide a logic "if" function. If one of the lines 270–275 indicates that a cassette is to be activated, the respective cassette will be activated at the appropriate time as controlled by the sequence 306 and the system will sequence to the next cassette. Conversely, if a line 270–275 does not indicate a cassette to be activated, the cassette will not be activated at the appropriate time, but the sequence will continue until the dispense cycle is complete. Thus, the gates 320–325 and 330–335 comprise sampling logic for the cassettes or solenoids to determine which ones are to dispense, and also provide signals from which clock pulses are generated, and either after a sampled programmed cassette has emptied or after a non-programmed cassette has been sampled, to continue the sequencing and the dispense cycle.

As noted earlier, the system may include suitable logic for preventing dispensing of pills at the wrong time. That is, if the programmed dispensing time is 9:00 a.m., and cassettes for 5:00 p.m. are inserted into the dispensing apparatus, no pills should be dispensed. The switches 48A–48D provide an interlock to allow this to be accomplished. The contacts of switch 48A for each of the six cassettes are connected together in series as noted earlier. Similarly, the contacts for switches 48C and 48D. The group of switches (e.g., 48A) are then connected to respective Or gates 374–377. These Or gates receive the 9:00 a.m., 1:00 p.m., 5:00 p.m. and 9:00 p.m. signals also, and their outputs are connected to an And gate 378. The output of the And gate 378 is indicated at 379 and can be connected to the right-hand terminal of start switch 222 in the start section 200, rather than this right-hand terminal of the start switch being connected to the ground as shown in FIG. 8. Assuming, for example, that all of the cassettes are to dispense at 9:00 a.m., then all of the switches 48A shown in FIG. 2 for the six cassettes are closed or otherwise in a state to complete a circuit to input terminal 370 of the Or gate 374. The Or gate 374 also will receive the 9:00 a.m. signal from the flip-flop 245, and both inputs to the Or gate 374 will be minus causing it to provide a minus output. The minus output to the And gate 378 causes a minus output to be supplied at 379 which, in turn, enables the start switch 222 to switch the start flip-flop 239 to start the dispense cycle. Thus, both of the inputs to one of the Or gates 374–377 must be minus in order for the dispense cycle to be started. The Or gates 375–377 function in a similar manner with time signals for the respective hours 9:00 a.m., 1:00 p.m., 5:00 p.m., and 9:00 p.m.

Although the apparatus, in the embodiment previously described, is mechanically rotated via actuation by solenoids connected to an electrical control means, it should be understood that a less expensive apparatus may be manufactured in accordance with this invention by utilizing a completely mechanical actuating device. For example, the control unit may be buttons mechanically connected to the rotatable compartments so that by pressing each button the magazine corresponding to it will be rotated until the next compartment is aligned over the opening. Again, magazines may be designed so that they cannot be manually rotated except upon complete insertion into the dispenser. Further, the dispenser may be designed so that upon actuating the mechanically connected button, the button will also punch a card or form to show exactly what pills were dispensed at that time.

DETAILED DESCRIPTION OF FIGS. 10–15

Referring to FIGS. 10 through 15, the embodiment of the dispensing apparatus herein illustrated, includes a housing 501 in general similar to the housing 14, in that it includes a magazine chamber 502 for receiving a set of magazines. The chamber 502 includes side walls 503 and a back wall 504. The side walls are provided with opposed pairs of guide channels 505 to receive a plurality of magazines. Side compartments 506 are provided outwardly from the side walls 503.

At the back side of the housing there is provided a set of horizontal tubular members 506 which receive indexing means for the magazines to be received in the magazine chamber 502. Access slots 508 are provided in the back wall 504.

Each horizontal tubular member 507 receives an indexing mandrel 509 having a longitudinal slot 510 which receives an indexing pawl 511 pivotally supported by a pin 512 and backed by a spring 513. The extremities of the mandrel 509 are provided with solenoid armatures 514 and 515 and corresponding solenoids 516 and 517.

A set of magazines 518 is provided, each magazine is relatively flat and rectangular and includes a shell 519 having a bottom wall 520, a back wall 521 slotted to receive the indexing pawl 511. The shell also includes a front wall 522 and side walls 533 provided with outwardly extending flanges 534. The shell 519 is fitted with a slide cover 535 having inturned side margins 536 slidably receiving the flanges 534.

Mounted within each magazine is a magazine wheel 537 having a central journal sleeve 538 and divided into a ring of storage compartments 539. The periphery of the magazine wheel 537 is provided with a set of indexing notches 540 corresponding to the number of storage compartments 539.

The storage compartments 539 are open at their axial ends but are closed at their lower extremities by the bottom wall 520 of the shell 519 and are closed at their upper extremities by the slide cover 535. The bottom wall 520 is provided with a bottom opening 541 corresponding in area to one of the storage compartments 539 and axially aligned top opening 542 is provided in the slide cover 535.

The essentially triangular spaces formed between the corners of the magazine shell 519 and the magazine wheel 537 form sub-chambers which receive means for controlling operation of the magazine wheel, one of the rear subcompartments receives a back movement restraining pawl 543 in the form of a lever journaled by a pivot 544. The pawl 543 is formed of plastic material and is provided with an integral spring element 545 terminating in a fixed end 546 fitting between retainer lugs 547. The pawl 543 is so positioned that its extended end engages the indexing pawl 511 which on reciprocation of the indexing pawl causes the magazine wheel 537 to turn clockwise as viewed in FIG. 11. The pawl 543 serves to prevent backward rotation of the magazine wheel.

Mounted in the remaining rearward subcompartment is a latch pawl 548 journaled by a pivot 544 and provided with an integral spring element 545. The latch pawl 548 is provided, in addition with an armature disk 549 which confronts one of the side walls 533 for magnetic attraction to a solenoid 550 provided in the corresponding side compartment 506. When the pawls 543 and 548 are in engagement with the corresponding notches 540, the magazine wheel 537 is locked against rotation in either direction.

Figure 12:
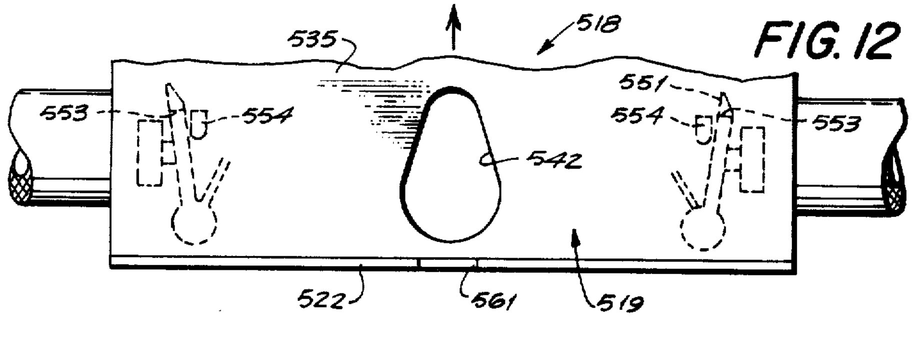
Figure 13:
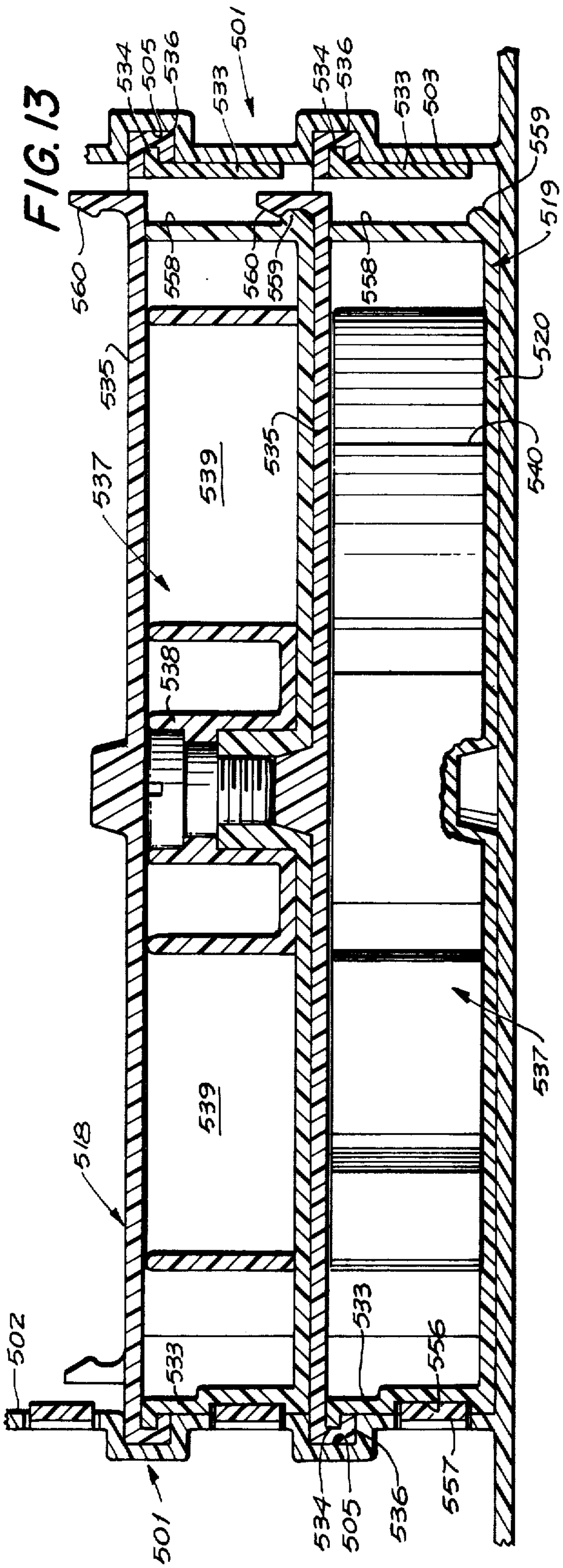
Figure 15:
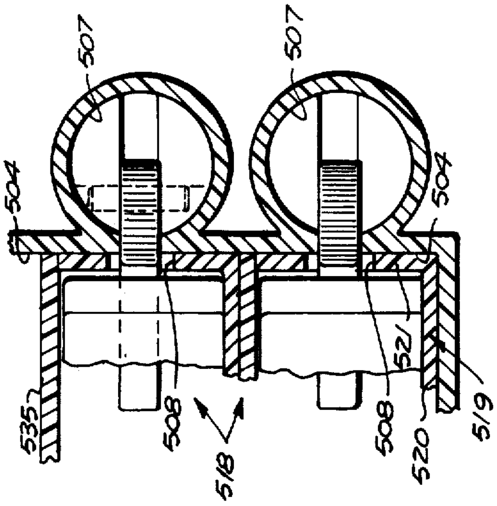
Figure 14:
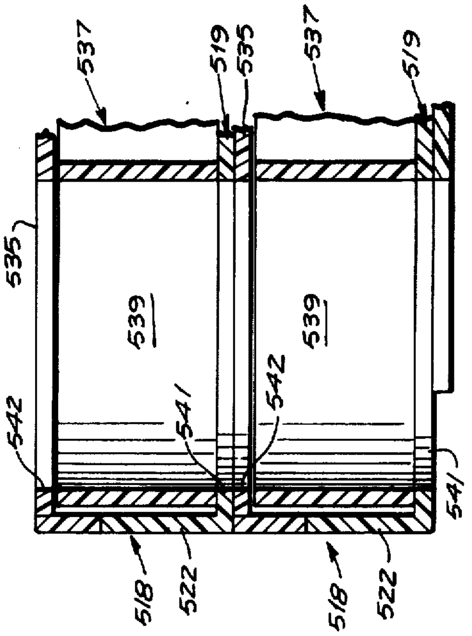

The two forward subchambers receive a pair of locking pawls 551 mounted in a manner similar to the pawls 543 and 548, each pawl 551 carries an armature 552. The upper surface of each locking pawl 551 is provided with a locking shoulder 553 engageable by a corresponding locking lug 554 depending from the slide cover 535. The purpose of the locking pawls 551 is to prevent removal of the slide covers 535 unless the magazine 518 is removed from the housing 501, and taken to a pharmaceutical department. Here, the magazine 518 is placed between solenoids 555 as shown in FIG. 12, which attract armatures 552.

The magazines 518 may be inserted individually into the magazine chamber 502 and may be removable retained therein by friction means including laterally facing recesses 556 provided in the side walls 533 of each magazine which are engaged by spring elements 557 provided in the side walls 503 of the housing.

It is preferred, however, to join a plurality of magazines so that they may be inserted or removed from the magazine chamber 502 as a unit, for this purpose each magazine is provided adjacent its side walls 533 with a pair of stacking latch slots 558, each having a keeper rib 559, also each cover 535 is provided with an upwardly directed pair of stacking latch lugs 560 which engage the keeper ribs of the magazine above.

As previously indicated, in order to open each magazine 510, it must be exposed to the magnetic force exerted by the pair of solenoids 555 when placed at opposite sides of the magazine. This is done by the pharmacist who fills the magazine with the appropriate medicine in pill or capsule form. The solenoids 555 are, of course, mounted in a suitable framework, not shown, located in the pharmacist's work area. The armatures 552 and solenoids 555 may be arranged so as to have complementary magnetic patterns so that the locking pawls 551 cannot be operated unless exposed to the proper magnetic pattern. The purpose of this is to minimize theft or unlawful tampering with the contents of each magazine.

One mode of operation involves the use of each magazine 518 for a particular medicine. The number of magazines to be used corresponds to the number of different medicines to be dispensed. If, for example, eight magazines are provided, then eight different medicines may be dispensed.

As shown, there are eleven storage compartments 539, the eleventh compartment aligning with the openings 541 and 542. The periphery of each magazine in the embodiment shown bears the number from 1 to 10 which are exposed by appropriate slots 561 provided in the front wall 522, the magazines are initially stacked with the numberal 10 exposed which appears in front of the compartments 539 in alignment with the openings 541 and 542.

The magazines 518 may be operated through the circuitry described in connection with the first embodiment. An operating cycle includes the operation of solenoid 550 to release the latch pawl 548 of a selected magazine followed by operation of the corresponding armature 514 and solenoid 516 to cause the indexing pawl 511 to engage the magazine wheel to move the wheel one unit whereupon the armature 515 and solenoid 517 is actuated to retract the indexing pawl, backward movement of the magazine wheel being prevented by the pawl 543.

The purpose in providing ten compartments is to provide dosages for a period of one week. The three extra dosages are reserved for emergency or in the event a patient fails to take a prescribed dosage.

While embodiments and applications of this invention have been shown and described, it should be apparent to those skilled in the art that many more modifications are possible without departing from the inventive concepts herein described. The invention, therefore, is not to be restricted except by the spirit of the appended claims.

I claim:

1. An apparatus for dispensing preselected pharmaceutical doses in readily handled units such as in pill or capsule form, the apparatus comprising:

a. a housing structure;

b. a plurality of magazines arranged to be removably received in the housing structure, each magazine adapted to contain a plurality of preselected similar pharmaceutical dosages differing from the dosages in the other magazines;

c. means for activating selected magazines to cause discharge of a dosage from each selected magazine to produce a preselected multiple dosage;

d. each magazine including means providing access to the dosages contained in the magazine and lock means for each magazine to prevent unauthorized access to the dosage therein;

e. and other lock means preventing discharge of dosages when the magazine is removed from the housing structure.

2. An apparatus for discharging articles into a receiver comprising:

a. a housing structure having a chamber arranged to removably receive a plurality of dispenser magazines inserted horizontally therein; each magazine having a vertically aligned upper and lower opening therein, the openings of the dispenser magazines being in vertical alignment when the magazines are disposed in the housing structure chamber;

b. a magazine wheel rotatable in each magazine, and including a ring of compartments open at their axial ends for sequential alignment with the openings in its corresponding magazine;

c. means for advancing selected magazine wheels to discharge the contents of corresponding compartments into a receiver;

d. and a locking means for each magazine to prevent rotation of the corresponding magazine wheel when removed from the housing structure.

3. An apparatus for discharging articles into a receiver comprising:

a. a housing structure having a chamber arranged to removably receive a plurality of dispenser magazines inserted horizontally therein; each magazine having a vertically aligned upper and lower opening therein, the openings of the dispenser magazines being in vertical alignment when the magazines are disposed in the housing structure chamber;

b. a magazine wheel rotatable in each magazine, and including a ring of compartments open at their axial ends for sequential alignment with the openings in its corresponding magazine;

c. means for advancing selected magazine wheels to discharge the contents of corresponding compartments into a receiver;

d. each magazine including a removable cover to expose the corresponding magazine wheel for reloading articles therein;

e. and a concealed lock means for each magazine to prevent unauthorized removal of its cover.

4. An apparatus for discharging articles into a receiver comprising:

a. a housing structure having a chamber arranged to removably receive a plurality of dispenser magazines inserted horizontally therein, each magazine having a vertically aligned upper and lower opening therein, the openings of the dispenser magazines being in vertical alignment when the magazines are disposed in the housing structure chamber;

b. a magazine wheel rotatable in each magazine, and including a ring of compartments open at their axial ends for sequential alignment with the openings in its corresponding magazine;

c. and means for advancing selected magazine wheels to discharge the contents of corresponding compartments into a receiver; advancing means including a drive member carried by the housing structure and extending into a corresponding magazine for engagement with its magazine wheel; and a pawl to prevent reverse movement of the magazine wheel.

5. An apparatus as defined in claim 4, wherein:

a. a second pawl engages the magazine wheel in cooperation with the reverse movement preventing the pawl to lock the magazine wheel against movement in either direction to prevent removal of articles from the magazines;

b. and magnetic means is provided for releasing the second pawl.

6. An article dispensing apparatus suitable for selectively dispensing a plurality of dissimilar articles comprising at least two magazines along a substantially vertical axis;

a. said magazines comprising a plurality of compartments, said compartments being separated by radially extending sidewalls and being rotatable around a center portion from which the sidewalls extend;

b. said magazines having a bottom portion containing an opening approximately the size of one of the compartments, the openings between the magazines being in substantially vertical alignment such that when a compartment of a magazine containing an article is rotated into vertical alignment with the openings, the article is dispersed out of the magazine and through the openings of all of the magazines beneath it;

c. each of said magazines having a top portion for sealing and locking the articles in the compartments which may be opened for filling the magazines;

d. said magazine having a locking means which contacts said rotatable compartments to prevent manual rotation of said compartments upon removal of the magazines from the dispensing apparatus;

e. said magazines having a switching means electrically connected to a control means;

f. a control means for selectively activating a drive means;

g. and drive means comprising a plurality of drive wheels corresponding to the number of magazines which rotate the compartments of each magazine and which may be selectively activated by the control means and which upon rotation of a compartment into alignment with the openings is deactivated by the switch means.

7. A pharmaceutical dosage dispensing magazine for use in conjunction with a dispensing drive means, the magazine comprising:

a. a wheel member having a ring of dosage receiving compartments;

b. an enclosure for the rotatable member having an outlet for dispensing dosages from the wheel member;

c. means carried by the wheel member engageable by the drive means for turning the wheel member in increments to effect discharge of dosages in sequence;

d. means operable when the enclosure is removed from the drive means for locking the wheel member against rotation to return the dosages in their respective pockets.

8. A pharmaceutical dosage dispensing magazine as defined in claim 7, wherein:

a. the enclosure includes a removable cover to provide access to the compartments for replacing dosages;

b. and means within the enclosure operable by an external key means to remove the cover.

9. An apparatus for discharging articles into a receiver comprising:

a. a housing structure having a chamber arranged to removably receive a plurality of dispenser magazines inserted horizontally therein; each magazine having a vertically aligned upper and lower opening therein, the openings of the dispenser magazines being in vertical alignment when the magazines are disposed in the housing structure chamber;

b. a magazine wheel rotatable in each magazine, and including a ring of compartments open at their axial ends for sequential alignment with the openings in its corresponding magazine;

c. means for advancing selected magazine wheels to discharge the contents of corresponding compartments into a receiver;

d. each magazine including a slidable cover on one side thereof, the cover having a locking boss; a locking pawl within the magazine engagable with the locking boss to secure the cover; and magnetic means engagable with the magazine, when free of the housing structure, for disengaging the locking pawl and boss to permit removal of the cover.

10. An apparatus for discharging articles into a receiver comprising:

a. a housing structure having a chamber arranged to removably receive a plurality of dispenser magazines inserted horizontally therein; each magazine having a vertically aligned upper and lower opening therein, the openings of the dispenser magazines being in vertical alignment when the magazines are disposed in the housing structure chamber;

b. a magazine wheel rotatable in each magazine, and including a ring of compartments open at their axial ends for sequential alignment with the openings in its corresponding magazine;

c. means for advancing selected magazine wheels to discharge the contents of corresponding compartments into a receiver; said means including a plurality of drive wheels corresponding to the neumber of magazines, an activating means to cause selected drive wheels to engage and advance corresponding magazine wheels; and deactivating means to cause disengagement of the drive wheels from the magazine wheels on predetermined rotation.

* * * * *